United States Patent [19]

Bailey

[11] Patent Number: 4,548,172

[45] Date of Patent: Oct. 22, 1985

[54] IGNITION-ASSISTED FUEL COMBUSTION SYSTEM

[75] Inventor: John M. Bailey, Dunlap, Ill.

[73] Assignee: Caterpillar Tractor Co., Peoria, Ill.

[21] Appl. No.: 506,941

[22] Filed: Jun. 22, 1983

[51] Int. Cl.[4] .......................................... F02M 61/14
[52] U.S. Cl. .................... 123/298; 123/297; 123/299; 123/301
[58] Field of Search ............... 123/297, 298, 299, 301, 123/279

[56] References Cited

U.S. PATENT DOCUMENTS

| | | | |
|---|---|---|---|
| 1,260,408 | 3/1918 | Leissner | 123/298 |
| 1,977,005 | 10/1934 | Mock | 299/107.6 |
| 1,988,754 | 1/1935 | Sleffel | 123/299 |
| 2,071,062 | 2/1937 | Cummins | 123/298 |
| 2,345,256 | 3/1944 | Hedlund | |
| 2,757,967 | 8/1956 | Lang | 299/107.6 |
| 2,779,320 | 1/1957 | Göschel et al. | |
| 3,195,520 | 7/1965 | Simko | |
| 4,275,844 | 6/1981 | Grgurich et al. | 239/533.3 |

FOREIGN PATENT DOCUMENTS

| | | | |
|---|---|---|---|
| 0300842 | 9/1913 | Fed. Rep. of Germany | 123/298 |
| 0485862 | 6/1927 | Fed. Rep. of Germany | 123/299 |
| 3123459 | 3/1983 | Fed. Rep. of Germany | |
| 1127237 | 12/1956 | France | 123/298 |
| 0040209 | 5/1977 | Japan | 123/298 |
| 0779104 | 7/1957 | United Kingdom | 123/299 |
| 0906486 | 9/1960 | United Kingdom | |
| 2049811 | 12/1980 | United Kingdom | |
| 2097471A | 11/1982 | United Kingdom | |

OTHER PUBLICATIONS

The Internal Combustion Engine, 2nd Ed., by: C. F. Taylor and E. S. Taylor, International Textbook Company (1961), p. 451.
Caterpillar Diesel Truck Engines (Sales Brochure), LEDT 3013, Nov. 1982.

Primary Examiner—Parshotam S. Lall
Attorney, Agent, or Firm—Anthony N. Woloch

[57] ABSTRACT

Conventional direct injection internal combustion engines will not completely ignite and burn relatively lower-cetane-number fuels such as 100 percent methanol or ethanol because the fuel spray injection pattern usually cannot carry or propagate a flame to all the injected fuel which is typically made up of individual fuel streams which are separated by pockets of fuel-deficient intake air. The present fuel combustion system (10) includes a fuel ignition-initiating device (26) such as a glow plug (70) and apparatus (98,102) for interconnectedly contacting and continuously bridging all of the individual fuel streams (66) with an auxiliary cloud (94) of well-atomized fuel. In this manner, a flame initiated by the fuel ignition-initiating device (26) is rapidly and completely propagated via the auxiliary cloud (94) of fuel to all the individual fuel streams (66).

4 Claims, 7 Drawing Figures

IGNITION-ASSISTED FUEL COMBUSTION SYSTEM

TECHNICAL FIELD

This invention relates to a fuel combustion system for a direct injection internal combustion engine and more particularly to such a fuel combustion system adapted to efficiently ignite and burn alternative fuels such as methanol or ethanol.

BACKGROUND ART

In view of dwindling supplies of traditional diesel fuels, it would be very advantageous if compression-ignition engines, more particularly direct fuel injection types, could be easily modified and adapted to burn more plentiful alternative fuels such as 100 percent methanol or ethanol. Such alternative fuels are regarded as attractive substitutes for conventional diesel fuels because methanol can be feasibly synthesized from a wide variety of substances such as coal, natural gas, wood, or animal waste and ethanol can be feasibly produced by fermentation of starch derived from widely grown plants such as sugar cane or corn. Moreoover, the amounts of nitrogen oxides and particulates are naturally lower and practically nonexistent, respectively, when burning such alcohol fuels as compared to burning traditional diesel fuels.

However, these alternative fuels are characterized by a cetane number or ignition value on the order of about 0–10 whereas traditional diesel fuels, such as Grade 2-D diesel fuel, are characterized by a cetane number of at least 40. Consequently, unlike traditional diesel fuels, these relatively lower-cetane-number alternative fuels do not autoignite under normal compression ratios in a compression-ignition engine merely by contacting and mixing with intake air which has been compressed in the combustion chamber by a piston and thereby typically heated to about 538° C. (1000° F.)

Such relatively lower-cetane-number alternative fuels can be locally ignited with the aid of an electrically-energized spark plug or glow plug which directly heats the fuel to a sufficiently elevated temperature of about 1000° C. (1832° F.) However, another major problem exists of completely igniting and burning all of the alternative fuel that is directly injected into the combustion chamber. This problem is due to the way fuel has been typically directly injected into the combustion chamber of a compression-ignition engine.

As shown in U.S. Pat. No. 4,275,844 issued to Grgurich et al on June 30, 1981, a conventional open combustion chamber of a direct injection compression-ignition engine typically includes a high pressure fuel injection nozzle having very small orifices. The orifices periodically spray a plurality of distinct and evenly spaced high pressure fuel streams to generally all sectors of the open combustion chamber which is already periodically filled with fresh intake air. This pattern of relatively concentrated conical fuel streams separated by pockets of intake air, similar to the radial spokes of a wheel, is desirable for direct injection engines to enable the fuel streams to quickly penetrate, atomize, mix and combust with the required relatively larger amounts of intake air before each cyclic power stroke of the open combustion chamber has substantially begun.

If a glow plug or spark plug is energized to produce a localized temperature of about 1000° C. (1832° F.) and is positioned in close enough proximity to one of the mutually spaced fuel streams of relatively lower-cetane-number alternative fuel, only that one fuel stream and perhaps other nearest fuel streams will ignite. However, the fuel-deficient air pockets separating each of the other remotely spaced fuel streams will prevent the flame from burning directly and rapidly to those other fuel streams. Consequently, the fuel streams which are not ignited or are only partially ignited are exhausted from the open combustion chamber as either wasted raw fuel or incompletely combusted fuel. This of course significantly and undesirably reduces the fuel economy and power output of the engine and raises the level of noxious emissions, particularly hydrocarbons, exhausted from the open combustion chamber.

The glow plug or spark plug perhaps could be over energized to produce a very high temperature which is much higher than 1000° C. (1832° F.) such that all of the fuel streams are sufficiently heated and directly ignited. However, this approach is very undesirable because, for example, the life of the glow plug or spark plug is thereby drastically shortened.

The present invention is directed to overcoming one or more of the problems as set forth above.

DISCLOSURE OF THE INVENTION

In one aspect of the present invention an improved fuel combustion system for a direct-injection internal combustion engine is disclosed having means for initiating localized ignition and flaming of fuel sprayed in the open combustion chamber and also having means for propagating the flame to other individual fuel streams simultaneously sprayed into the open combustion chamber which would not otherwise be ignited by the fuel ignition-initiating means.

There is a growing need to easily modify conventional direct injection internal combustion engines so that they can efficiently burn more plentiful alternative fuels such as 100 percent methanol or ethanol. The flame propagating means of the present invention includes a means for simultaneously and interconnectedly bridging all of the individual fuel streams with an auxiliary cloud of fuel. In this manner, a flame started at the fuel ignition-initiating means may be directly, rapidly, and completely propagated to all of the other fuel streams to ensure complete and rapid combustion.

The results of actual tests in direct-injection compression-ignition engines show that this improved fuel combustion system burning such alternative fuels exhibits about the same fuel combustion efficiency as a conventional fuel combustion system burning traditional diesel fuel. Moreover, when this improved fuel combustion system burned 100 percent alternative fuels under most engine operating conditions, it produced about the same or even lower level of noxious emissions than that produced by a conventional fuel combustion system burning traditional diesel fuel.

BEST MODE FOR CARRYING OUT THE INVENTION

Figure 1:
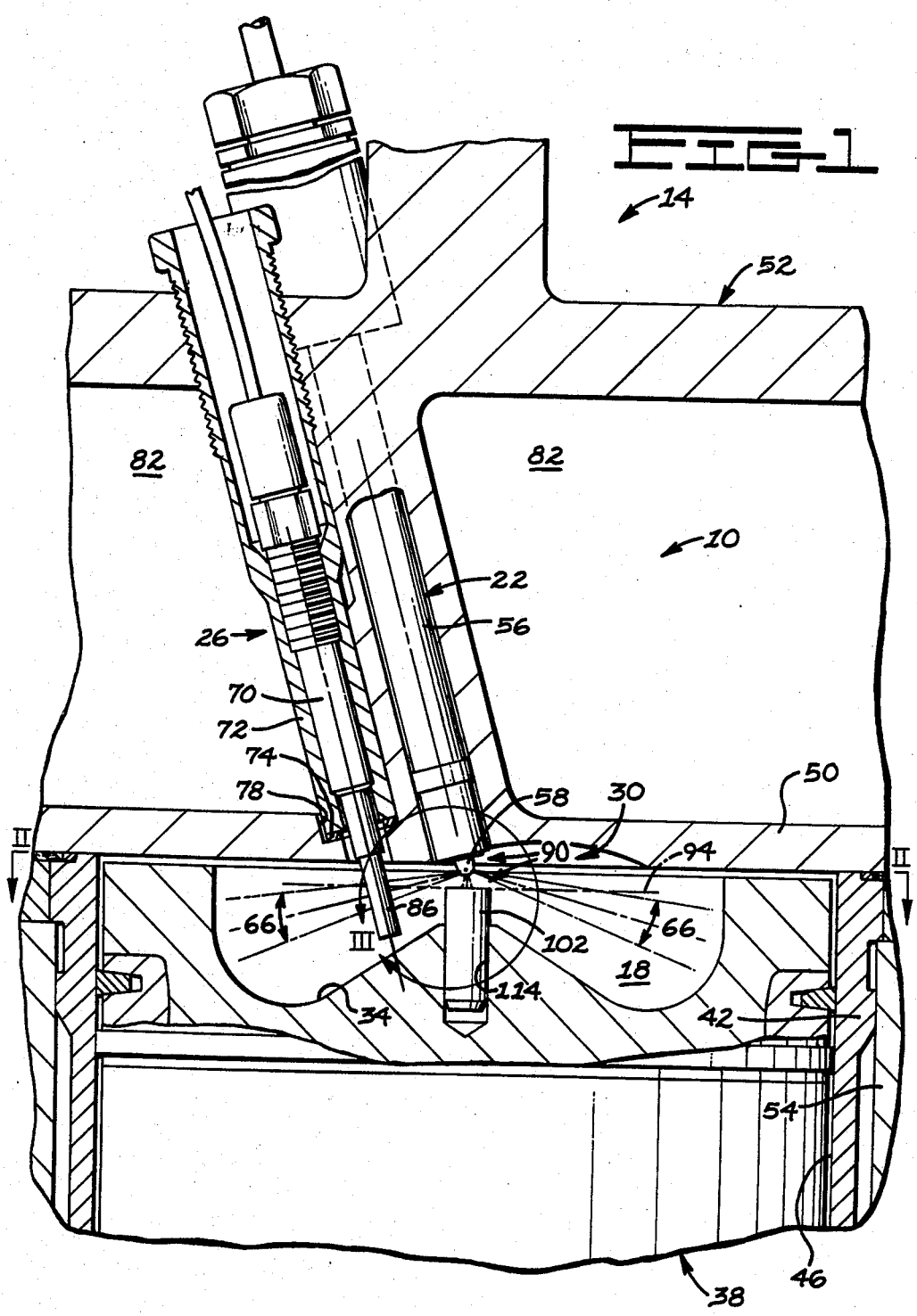
FIG. 1 is a diagrammatic partial cross-sectional side elevation view of the preferred embodiment of the improved fuel combustion system as incorporated in a direct-injection internal combustion engine.

Referring to FIGS. 1 through 5 wherein similar reference characters designate similar elements or features throughout the figures, there are shown two alternative embodiments of the improved fuel combustion system of the present invention.

Figure 2:
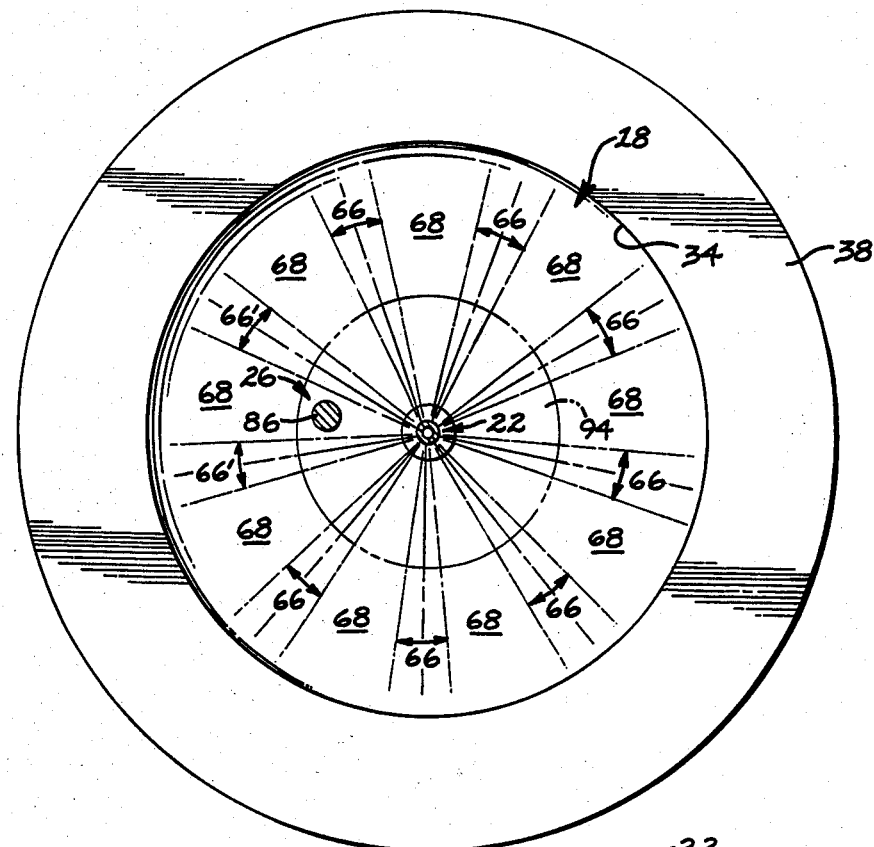
FIG. 2 is a diagrammatic partial view taken along line II—II of FIG. 1.
Figure 3:
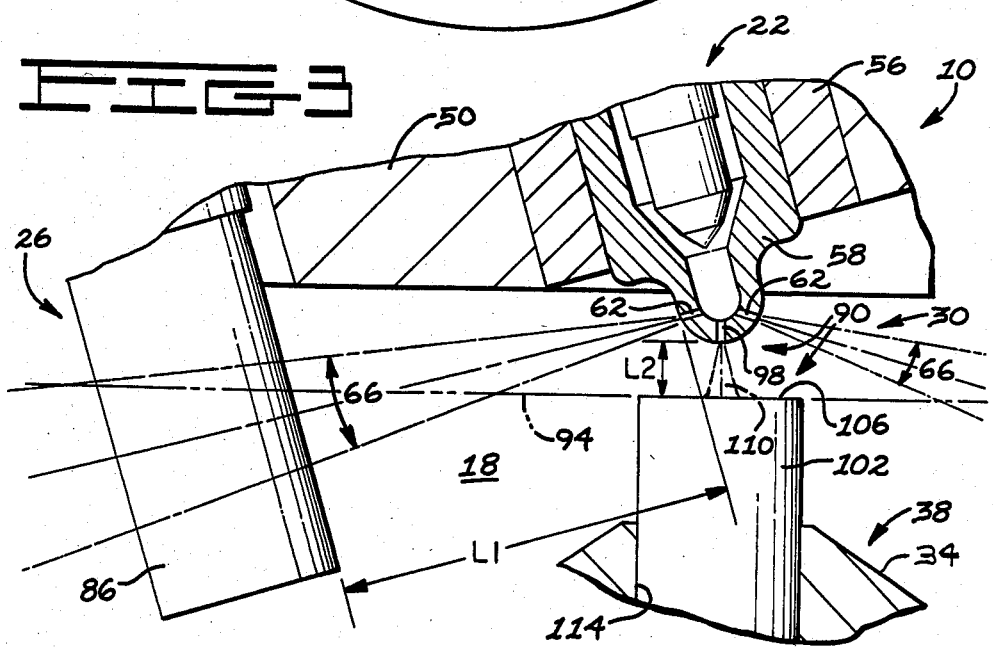
FIG. 3 is a diagrammatic enlarged partial view of FIG. 1 taken within the area encircled by line III—III of FIG. 1.

In FIGS. 1–3, which illustrate the preferred embodiment, an improved fuel combustion system 10 is shown as incorporated in a direct fuel injection internal combustion engine 14 (FIG. 1). For example, the engine 14 may have originally been a conventional compression-ignition engine which has been modified as described below. The fuel combustion system 10 includes a fuel combustion chamber 18, a fuel injection nozzle 22, means 26 for initiating localized ignition and flaming of fuel in the combustion chamber 18, and means 30 for propagating the flame which is started by the fuel ignition-initiating means 26.

The combustion chamber 18 is commonly known as an open combustion chamber because the combustion space incorporates no restrictions that are sufficiently small to cause large differences in gas pressure between the different parts of the chamber during the combustion process.

The open combustion chamber 18 is defined mainly by, for example, a conventional Mexican-hat-shaped crater wall 34 of a reciprocable piston 38, shown at about the top dead center position of its compression stroke, a stationary cylinder liner 42 having a bore 46 in which the piston 38 reciprocates, and a bottom deck 50 of a cylinder head 52 which clamps the cylinder liner 42 to an engine block 54. Preferably the open combustion chamber 18 is of the quiescent or low air swirl type to minimize heat rejection and flow restriction of fresh air intake air which is periodically introduced into the open combustion chamber 18 by one or more valves (not shown).

The fuel injection nozzle 22 includes a nozzle body 56 extending substantially through the cylinder head 52. Connected to one end portion of the nozzle body 56 is a nozzle tip 58 (FIG. 3) which preferably projects directly into the central portion of the open combustion chamber 18. The nozzle tip 58 includes a plurality of evenly spaced primary fuel spray orifices 62 which are adapted during engine operation to simultaneously spray distinct and evenly spaced primary fuel streams 66 radially outwardly into the open combustion chamber 18. All the injected primary fuel streams 66 are conically shaped and are mutually separated by pockets of intake air 68 (FIG. 2).

In all the FIGS. 1–5 the fuel ignition-initiating means 26 is shown, for example, as mainly including an electrically-energizable glow plug 70 which is housed in an adapter 72. As shown in FIG. 1, the adapter 72 extends almost completely through the cylinder head 52 and is seated against an annular seal 74 disposed in a counter-bore 78 of the bottom deck 50. The adapter 72 and the seal 74 which, for example, may be made of stainless steel and annealed copper, respectively, protect the glow plug 70 from contacting liquid coolant which is circulated through internal chambers 82 of the cylinder head 52. At one end of the glow plug 70 is an electrical resistance element 86 which projects directly into the open combustion chamber 18 so that it is spaced a preselected unobstructed distance L1 (FIG. 3) from the nearest primary fuel spray orifice 62 of the nozzle tip 58.

Alternatively, the fuel ignition-initiating means 26 may mainly include, instead of the glow plug 70, an electrically-energizable spark plug or some other high energy device which during engine operation can be continuously or intermittently energized to locally heat the fuel to a predetermined and elevated fuel igniting temperature that is necessary to start ignition of the relatively lower-cetane-number alternative fuel. If a spark plug is substituted for the glow plug 70, the reference number 86 would refer to an electrode element of the spark plug.

In order to propagate the localized flame started by the fuel ignition-initiating means 26 to those primary fuel streams 66 which are too remote and widely separated by pockets of intake air to be directly ignited by the fuel ignition-initiating means 26, the flame-propagating means 30 includes means 90 (FIGS. 1 and 3) for simultaneously and interconnectedly contacting and continuously bridging all of the primary fuel streams 66 with an auxiliary cloud 94 of fuel. In both the preferred embodiment of FIGS. 1–3 and also the alternative embodiment of FIGS. 4–5, the interconnectedly-fuel-bridging means 90 includes a secondary fuel spray orifice 98 (FIGS. 3 and 4) generally axially disposed on the nozzle tip 58 and an impingement surface element 102 having a deflecting face 106 (FIGS. 3 and 4) which faces toward the secondary fuel spray orifice 98 and is spaced a preselected unobstructed minimum distance L2 therefrom.

The secondary spray orifice 98 of the nozzle tip 58 is adapted during engine operation to spray at the deflecting face 106 a secondary fuel stream 110 of the same fuel composition as the primary fuel streams 66. The deflecting face 106 controlledly disperses the secondary fuel stream 110 to form the auxiliary cloud 94 of well-atomized fuel. In the preferred embodiment of FIGS. 1–3, the impingement surface element 102 is a cylindrical pin which, for example, may be made of stainless steel. The pin is positioned in a central bore 114 of the piston crater wall 34 and is retained therein preferably by an interference fit. A top portion of the upwardly projecting pin 102 defines the deflecting face 106 and is contoured and oriented as necessary to effect the desired shape and dispersing direction of the auxiliary cloud 94 of fuel. The deflecting face 106 is spaced from the secondary fuel spray orifice 98 at the preselected unobstructed minimum distance L2 when the piston 38 reaches the top dead center position of its periodic stroke. Alternatively, the impingement surface element 102 and deflecting face 106 may be formed or cast integrally with the piston crater wall 34.

In FIGS. 1–3, the deflecting face 106 is flat and lies in a plane which is normal to the longitudinal axis of the secondary fuel spray orifice 98 and thus normal to the initial flow direction of the secondary fuel stream 110 so that the auxiliary cloud 94 of fuel dispersed from the deflecting face 106 resembles a thin circular sheet or relative flat disc well-atomized fuel which intersects all of the primary fuel streams 66. Alternatively, the deflecting face 106 may be undulated or convex or concaved shaped and/or canted with respect to the secondary fuel spray orifice 98 in order to ensure that the secondary fuel stream 110 is deflected in preselected directions which intersect all of the primary fuel streams 66.

Figure 5:
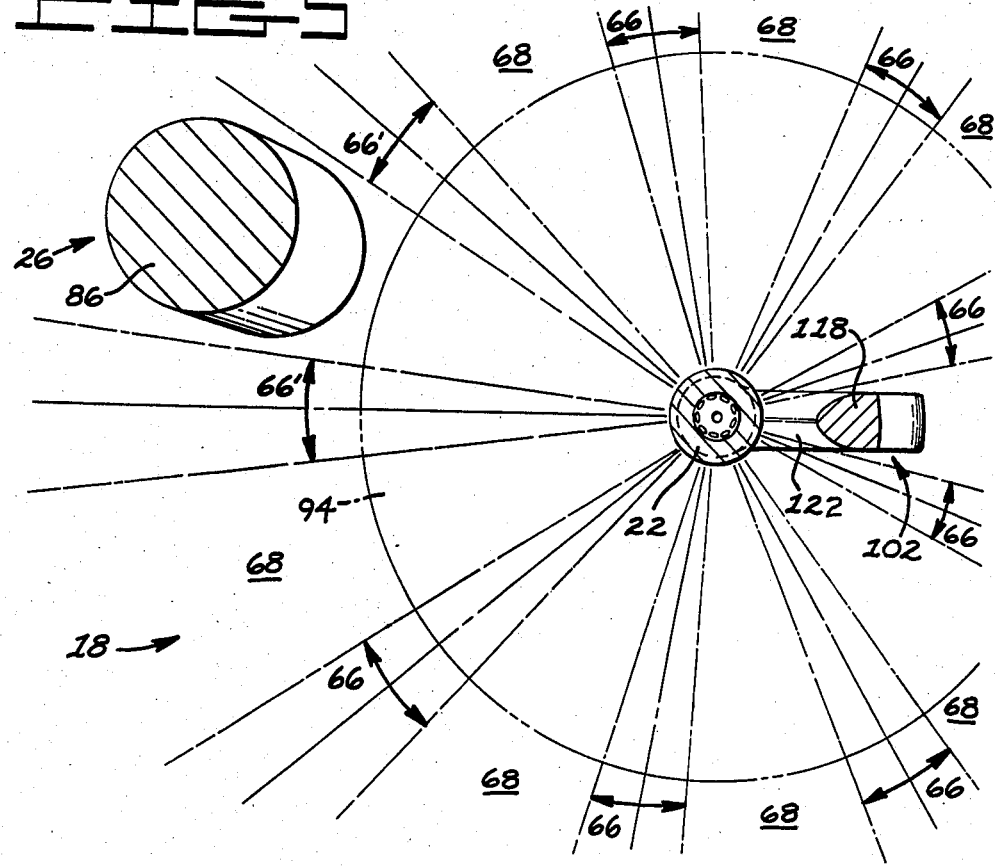
FIG. 5 is a diagrammatic enlarged partial view taken along line V—V of FIG. 4.

In FIGS. 2 and 5 the auxiliary cloud 94 of fuel is illustrated as reaching close enough proximity to the glow plug 70 to be directly ignited by the element 86. As shown in FIG. 2, one or two of the primary fuel spray orifices 62 may also be adapted to spray their primary fuel streams 66' in close enough proximity to the glow plug 70 so that the element 86 also directly ignites those primary fuel streams 66'. In this case, the element 86 is preferably located about midway between two of the primary fuel streams 66'.

Alternatively, the element 86 of the glow plug 70 or other fuel ignition-initiating means may be adapted to be distantly spaced from the auxiliary cloud 94 of fuel and positioned closely with respect to at least one of the primary fuel streams 66'. In this case, the element 86 of the glow plug 70 directly ignites only the primary fuel streams 66' in close proximity which then convey the flame to the auxiliary cloud 94 of fuel and thence to the other interconnectedly bridged primary fuel streams 66. The flame-propagating relationship between the ignition-initiating means 26, the auxiliary cloud 94 of fuel, and the primary fuel streams 66 may be varied as needed by changing various parameters of the fuel combustion system 10 such as the distances L1,L2, the fuel injection pressure of the nozzle 22, the size of the secondary fuel spray orifice 98, and the contour and orientation of the deflecting face 106 relative to the element 86 and the fuel spray orifices 62,98.

Figure 4:
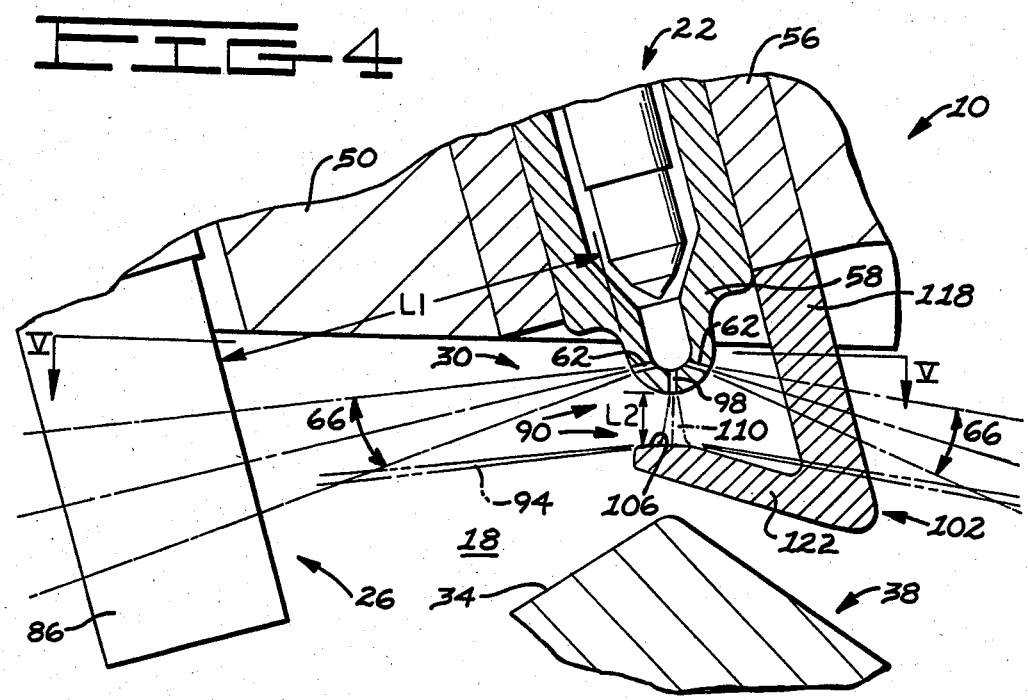
FIG. 4 is a diagrammatic enlarged partial view similar to FIG. 3 but showing an alternative embodiment of the present invention.

Referring now to FIGS. 4 and 5, there is shown an alternative embodiment of the present invention. This alternative embodiment basically differs from the preferred embodiment of FIGS. 1–3 in the structure and location of the impingement surface element 102.

In FIGS. 4 and 5 the impingement surface element 102 is connected to and forms an extension of the nozzle body 56. The impingement surface element 102 has a first finger-like portion 118 extending outwardly from the nozzle body 56 generally parallel to the longitudinal axis of the fuel injection nozzle 22 and which is adapted to be positioned outside the pathways of all the primary fuel streams 66.

The first finger-like portion 118 terminates into a second finger-like portion 122 which defines the deflecting face 106 that faces the secondary fuel spray orifice 98 and is adapted to extend into the path of the secondary fuel stream 110. Since the deflecting face 106 in this alternative embodiment is connected to the stationary fuel injection nozzle 22 rather than the reciprocating piston 38, the preselected unobstructed distance L2 between the deflecting face 106 and the secondary fuel spray orifice 98 is constant. Furthermore, the deflecting face 106 is contoured and oriented as needed to effect the desired shape and dispersing direction of the auxiliary cloud 94 of well-atomized fuel so that all of the primary fuel streams 66 are intersected and interconnectedly bridged.

In either embodiment it is important to provide a relatively continuous cloud 94 of well-atomized fuel which interconnectedly contacts and continuously bridges all of the primary fuel streams 66. To achieve this objective, the fuel flow through the secondary fuel spray orifice 98 should constitute a certain percentage of the total fuel flowing through the primary and secondary fuel spray orifices 62,98. Insufficient fuel flow through the secondary fuel spray orifice 98 prevents the cloud 94 of fuel from sufficiently and continuously bridging all the primary fuel streams 66 so that not all primary fuel streams 66 ignite. On the other hand, excessive fuel flow through the secondary fuel spray orifice 98 prevents sufficient intake air from mixing with the auxiliary cloud 94 of fuel causing incomplete combustion.

The relative fuel flows are preferably controlled by preselecting the relative cross-sectional areas of the fuel spray orifices 62,98. In the embodiments illustrated, the cross-sectional area of the secondary fuel spray orifice 98 should generally constitute about 5 to 30 percent of the total cross-sectional area of all of the primary and secondary fuel spray orifices 62,98. More particularly, the percentage is preferably about 15 to 25 percent in the preferred embodiment of FIGS. 1–3 whereas the percentage is somewhat relatively less in the alternative embodiment of FIGS. 4–5. In FIGS. 4–5, the secondary fuel stream 110, dispersed by the nonmoving deflecting face 106 to form the auxiliary cloud 94 of fuel, always intersects the primary fuel streams 66 and/or the ignition-initiating means 26 at about the same preselected locations because the distance between the deflecting face 106 and the secondary fuel spray orifice 98 is fixed. Thus, in FIGS. 4–5, the fuel flow constituting the secondary fuel stream 110 can be conserved to some extent as compared to the embodiment of FIGS. 1–3.

INDUSTRIAL APPLICABILITY

In the use of the improved fuel combustion system 10, a localized flame initiated by the fuel ignition-initiating means 26 is rapidly and completely propagated to all the fuel which is directly injected into the open combustion chamber 18.

Periodically, as the reciprocating piston 38 approaches the top dead center position of its compression stroke, fuel is simultaneously injected directly into the open combustion chamber 18 through the primary and secondary fuel spray orifices 62,98. This pressurized fuel emanating from the primary fuel spray orifices 62 forms conically-shaped and mutually spaced primary fuel streams 66 which penetrate through the quiescent intake air 68 almost to the outer periphery of the open combustion chamber 18. Fuel simultaneously emanating from the secondary fuel spray orifice 98 strikes the deflecting face 106 of the impingement surface element 102 and is dispersed radially to form an auxiliary cloud 94 of well-atomized fuel which intersects and interconnectedly bridges all of the primary fuel streams 66.

The fuel ignition-initiating means 26 is either intermittently or continuously energized during engine operation so that the fuel ignition-initiating means 26 directly ignites and initiates a flame in at least the auxiliary cloud 94 of fuel or one of the primary fuel streams 66'. If the fuel ignition-initiating means 26 includes a glow plug 70, the glow plug is electrically energized and its electrical resistance element 86 is thereby heated to a preselected elevated fuel-igniting temperature. The localized flame thus created then rapidly propagates to all of the other unignited primary fuel streams 66 by burning across the auxiliary cloud 94 of fuel which interconnectedly contacts and continuously bridges all of the primary fuel streams 66. Another advantage of providing the interconnectedly-fuel-briding means 90 is that it helps prolong the life of the fuel ignition-initiating means 26 since the means 26 need only be energized at minimal levels sufficient for localized heating and ignition of fuel which is in nearest proximity to it.

Figure 6:
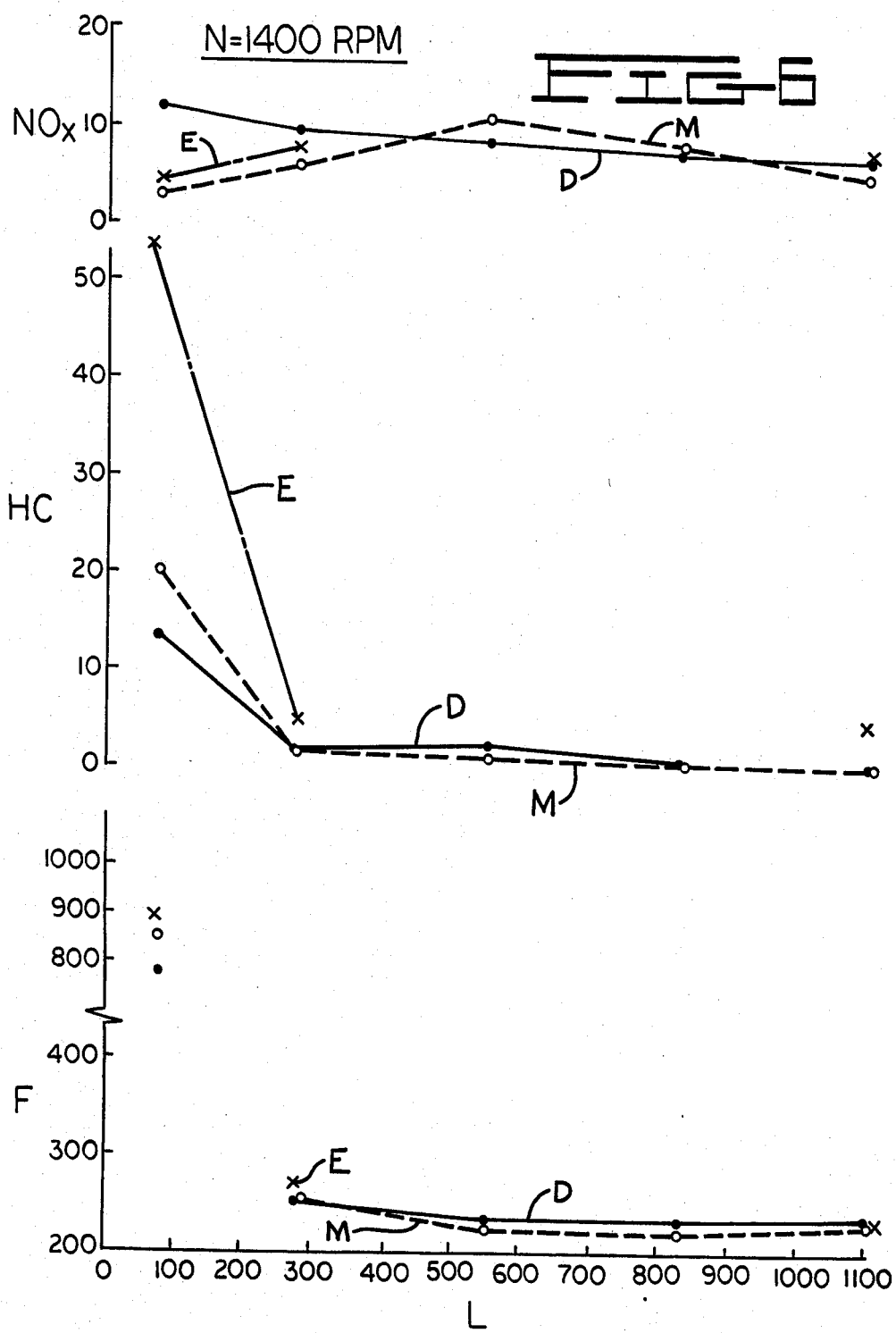
FIG. 6 is a graph which plots the comparative results of actual engine tests which measured the amounts of noxious emissions and adjusted fuel consumption as a function of varying engine load obtained from the preferred embodiment of the improved fuel combustion system, burning 100% methanol or ethanol, versus a conventional fuel combustion system burning traditional diesel fuel. These tests were run at a constant engine speed of 1400 revolutions per minute (rpm).
Figure 7:
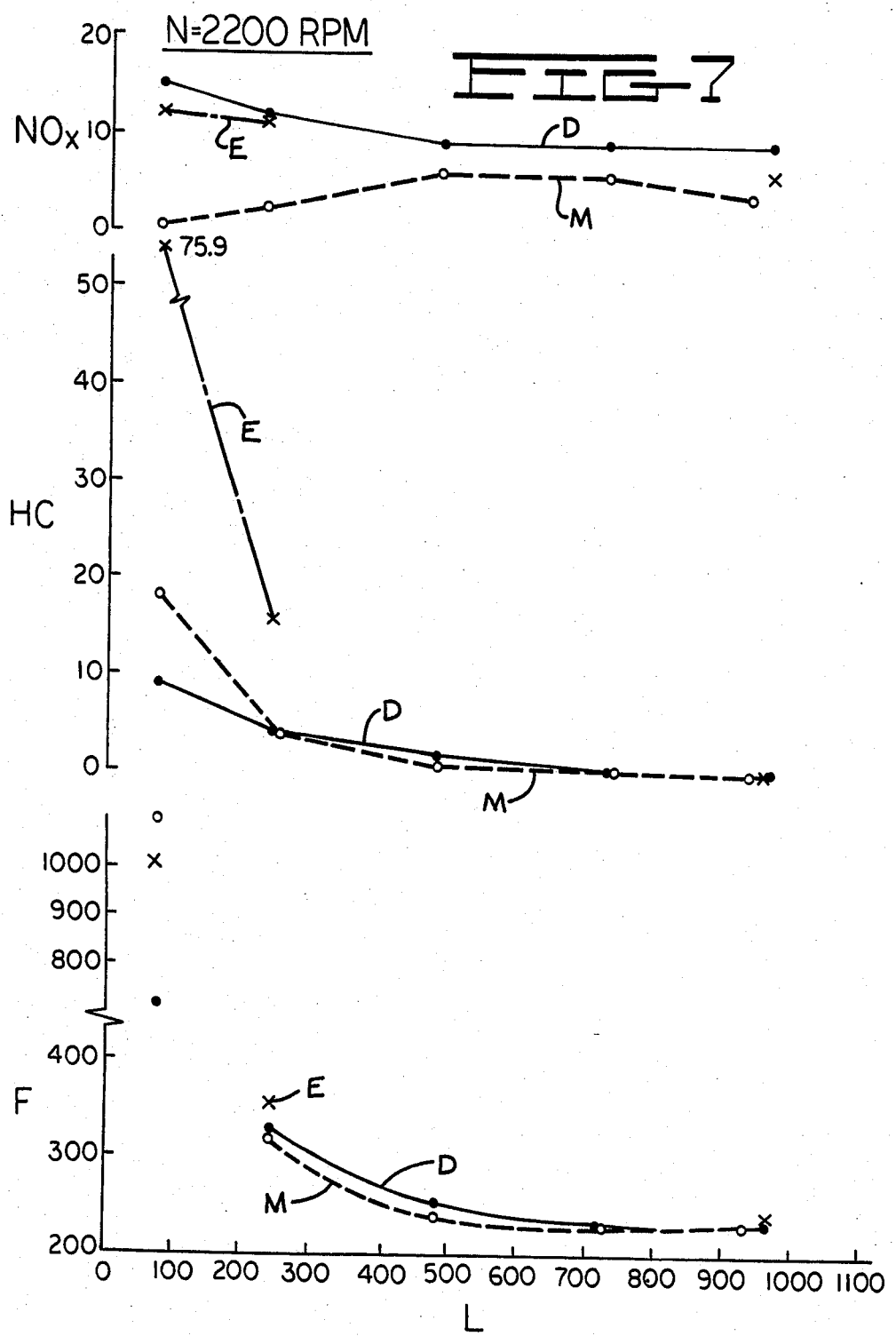
FIG. 7 is a graph similar to FIG. 6 but showing the results of similar tests run at a higher constant engine speed of 2200 rpm.

FIGS. 6 and 7 represent results of actual single cylinder engine tests which compare the rate of fuel consumption and amounts of emissions produced by the preferred embodiment (FIGS. 1-3) of the present invention, burning 100 percent methanol (M) or ethanol. (E), with a conventional fuel combustion system burning traditional Grade 2-D diesel fuel (D). Both engines had a cylinder bore diameter of about 121 mm (4.75 in.) and a piston stroke of about 152 mm (6.00 in.). The conventional open combustion chamber basically differed from the preferred embodiment of the present invention in that it did not have a fuel ignition-initiating means 26, nor a secondary fuel spray orifice 98, nor an impingement surface element 102.

Various parameters of the preferred embodiment fuel combustion system that was tested were optimized to burn 100% methanol and were approximately as follows:

| | |
|---|---|
| glow plug fuel-igniting temperature | 1000° C. (1832° F.) |
| distance L1 | 11.5 mm (0.453 in.) |
| minimum distance L2 | 1.85 mm (0.073 in.) |
| fuel injection pressure | 69,000 kPa (10,000 psi) |
| number of primary fuel spray orifices | Nine |
| cross-sectional diameter of primary fuel spray orifices | 0.207 mm (0.0081 in.) |
| cross-sectional diameter of secondary fuel spray orifice | 0.318 mm (0.0125 in.) |
| diameter of deflecting face | 7.0 mm (0.276 in.) |

In both FIGS. 6 and 7, the amounts of brake specific nitrogen oxides ($NO_x$), brake specific hydrocarbons (HC), and brake specific fuel consumption (F) are plotted as a function of varying engine load (L) at a constant engine speed (N). The amounts of nitrogen oxides ($NO_x$) and hydrocarbons (HC) produced by the engines are measured in units of grams per brake horsepower-hour. The amount of brake specific fuel consumption (F) is measured in units of grams per kilowatt-hour, however, the results (F) for methanol (M) and ethanol (E) are downwardly adjusted as if the energy content per gram of methanol (M) or ethanol (E) were the same as the actually much higher energy content per gram of diesel fuel (D). The amount of varying engine load (L) is measured in terms of brake mean effective pressure and is expressed in units of kilopascals. In FIG. 6, the tests were run at a constant engine speed (N) of 1400 revolutions per minute (rpm) which represented the peak torque speed of the engines whereas the tests of FIG. 7 were run at a constant engine speed (N) of 2200 rpm which represented the rated speed of the engines.

From the FIGS. 6 and 7 it is seen that the fuel combustion system 10 of the present invention burning 100 percent methanol (M) or ethanol (E) efficiently combusts fuel at about the same adjusted rate of fuel consumption per kilowatt-hour produced as the conventional fuel combustion chamber burning traditional Grade 2-D diesel fuel (D). In addition, the system 10 burning 100 percent methanol (M) produced about the same amount of hydrocarbons (HC) as the conventional system burning diesel fuel (D). The hydrocarbon (HC) emissions are considerably higher for the same system 10 burning ethanol mainly because the various fuel combustion system parameters were optimized for methanol fuel. Of course, in any fuel combustion system the amount of nitrogen oxides ($NO_x$) produced by alcohols (M,E) are naturally expected to be advantageously lower than that produced by traditional diesel fuels (D). Similarly, while not illustrated in either FIGS. 6 or 7, in any fuel combustion system, the amount of particulates produced by alcohols (M,E) are naturally expected to be practically nonexistent as compared to the amount of particulates produced by traditional diesel fuels (D).

The generally excellent level of fuel consumption for a given power output and simultaneously low level of hydrocarbon emissions, particularly at low engine loads, highlights the effectiveness of the present invention. Without the addition of the fuel ignition-initiating means 26, the flame-propagating means 30, and the interconnectedly-fuel-bridging means 90, a significant amount of such alternative fuel injected into a conventional fuel open combustion chamber would not be ignited or would not burn completely resulting in either much less engine power output and higher noxious hydrocarbon (HC) emissions or even total inoperability of the engine.

Other aspects, objects and advantages of this invention can be obtained from a study of the drawings, the disclosure and the appended claims.

I claim:

1. A fuel combustion system (10) of a direct-injection internal combustion engine (14) including an open combustion chamber (18), a fuel injection nozzle (22) projecting directly into said open combustion chamber (18) and having a plurality of primary fuel spray orifices (62) adapted during engine operation to simultaneously spray distinct and mutually spaced primary fuel streams (66) radially outwardly into the open combustion chamber (18), the improvement comprising:

means (26) for initiating localized ignition and flaming of fuel in the open combustion chamber (18), said fuel ignition-initiating means (26) being adapted to be energized to an elevated fuel igniting temperature during engine operation and projecting directly into said open combustion chamber (18); and means (30) for propagating the flame, started by said fuel ignition-initiating means (26), to those primary fuel streams (66) which would not otherwise be directly ignited by said fuel ignition-initiating means (26), said flame-propagating means (30) including means (90) for simultaneously and interconnectedly bridging all of said primary fuel streams (66) with an auxiliary cloud (94) of fuel, wherein said interconnectedly-fuel-bridging means (90) includes a secondary fuel spray orifice (98) also disposed on said fuel injection nozzle (22) and an impingement surface element (102) having a preselected shaped deflecting face (106) unobstructively spaced from and facing said secondary fuel spray orifice (98), said secondary fuel spray orifice (98) adapted during engine operation to simultaneously spray a secondary fuel stream (110) at said deflecting face (106) so that the secondary fuel stream (110) is controlledly deflected radially outwardly to form said auxiliary cloud (94) of fuel which interconnectedly bridges all of said primary fuel streams (66), said secondary fuel stream being of the same composition as the primary fuel streams (66) and wherein either one of said primary fuel streams (66') or said auxiliary cloud (94) of fuel is adapted during engine operation to contact and to be directly ignited by the fuel ignition-initiating means (26).

2. The fuel combustion system (10) as in claim 1 wherein said impingement surface element (102) is connected to and forms an extension of said fuel injection nozzle (22), said impingement surface element (102) having a first finger-like portion (118) extending outwardly from said fuel injection nozzle (22) and adapted to be positioned outside of the pathways of the primary fuel streams (66), emitted during engine operation by said primary fuel spray orifices (62), said first finger-like portion (118) terminating in a second finger-like portion (122) defining said deflecting face (106) wherein said deflecting face (106) is unobstructively spaced a constant preselected distance (L2) from the secondary fuel spray orifice (98) and is adapted to extend into the path of said secondary fuel stream (110) emitted during engine operation by the secondary fuel spray orifice (98).

3. The fuel combustion system (10) as in claim 1 further including a piston (38) having a crater wall (34) facing said secondary fuel spray orifice (98) wherein said impingement surface element (102) is connected to and projects upwardly from said piston crater wall (34).

4. The fuel combustion system (10) as in claim 3 wherein said impingement surface element (102) is a cylindrical pin connected to said piston crater wall (34) and a top portion of said cylindrical pin defines said deflecting face (106).

* * * * *